(12) United States Patent
Li et al.

(10) Patent No.: US 11,025,709 B2
(45) Date of Patent: Jun. 1, 2021

(54) LOAD PROCESSING METHOD AND APPARATUS

(71) Applicant: Tencent Technology (Shenzhen) Company Limited, Shenzhen (CN)

(72) Inventors: Junyao Li, Shenzhen (CN); Liqiang Xie, Shenzhen (CN); Xiaoming Wang, Shenzhen (CN); Qinglin Fang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 58 days.

(21) Appl. No.: 16/208,197

(22) Filed: Dec. 3, 2018

(65) Prior Publication Data

US 2019/0104174 A1 Apr. 4, 2019

Related U.S. Application Data

(63) Continuation-in-part of application No. PCT/CN2017/091429, filed on Jul. 3, 2017.

(30) Foreign Application Priority Data

Aug. 12, 2016 (CN) .......................... 201610662366.4

(51) Int. Cl.
*H04L 29/08* (2006.01)
*G06F 9/50* (2006.01)
(Continued)

(52) U.S. Cl.
CPC ........ *H04L 67/1008* (2013.01); *G06F 9/5027* (2013.01); *G06F 11/3006* (2013.01);
(Continued)

(58) Field of Classification Search
CPC .................................................. H04L 67/1012
See application file for complete search history.

(56) References Cited

U.S. PATENT DOCUMENTS

| 2003/0126200 | A1* | 7/2003 | Wolff | ........................ | G06F 9/52 |
| | | | | | 709/203 |
| 2005/0013316 | A1* | 1/2005 | Liao | ...................... | H04L 47/788 |
| | | | | | 370/449 |

(Continued)

FOREIGN PATENT DOCUMENTS

| CN | 101554073 A | 10/2009 |
| CN | 101695050 A | 4/2010 |

(Continued)

OTHER PUBLICATIONS

Tencent Technology, ISRWO, PCT/CN2017/091429, Aug. 30, 2017, 6 pgs.

(Continued)

*Primary Examiner* — Ario Etienne
*Assistant Examiner* — Sm Z Islam
(74) *Attorney, Agent, or Firm* — Morgan, Lewis & Bockius LLP (57) ABSTRACT

A computing system for load processing obtains a current time and a reported load amount from an access machine at the current time and determines a delayed cognitive load amount allocated to the access machine at a first time period by subtracting a first time difference from the current time. Next the computing system determines an actual load amount of the access machine at the current time by adding the reported load amount and the delayed cognitive load amount and determines whether the access machine is running at an overload condition by comparing the actual load amount of the access machine at the current time and a maximum load amount threshold for the access machine. The present application can accurately determine the load (Continued)

amount that the access machine has received and schedule user terminals received by the access machine to prevent overloaded operation of the access machine.

16 Claims, 6 Drawing Sheets

(51) Int. Cl.
  *G06F 11/34* (2006.01)
  *H04L 12/26* (2006.01)
  *G06F 11/30* (2006.01)

(52) U.S. Cl.
  CPC ...... *G06F 11/3419* (2013.01); *G06F 11/3433* (2013.01); *H04L 43/16* (2013.01); *H04L 67/1012* (2013.01); *H04L 67/1021* (2013.01); *H04L 67/32* (2013.01); *G06F 2201/81* (2013.01); *G06F 2201/88* (2013.01); *G06F 2209/508* (2013.01); *G06F 2209/5019* (2013.01); *H04L 43/0817* (2013.01)

(56) References Cited

U.S. PATENT DOCUMENTS

| | | | | |
|---|---|---|---|---|
| 2013/0246715 | A1* | 9/2013 | Miyauchi | G06F 12/0284 711/147 |
| 2013/0290336 | A1* | 10/2013 | Moriguchi | G06T 7/215 707/737 |
| 2016/0044140 | A1 | 2/2016 | Suzuki | |

FOREIGN PATENT DOCUMENTS

| | | |
|---|---|---|
| CN | 103748914 A | 4/2014 |
| CN | 104580489 A | 4/2015 |
| CN | 104598551 A | 5/2015 |
| CN | 105516369 A | 4/2016 |
| CN | 105791144 A | 7/2016 |
| CN | 105847381 A | 8/2016 |

OTHER PUBLICATIONS

Tencent Technology, IPRP, PCT/CN2017/091429, Feb. 12, 2019, 5 pgs.

* cited by examiner

LOAD PROCESSING METHOD AND APPARATUS

RELATED APPLICATION

This application is a continuation-in-part application of PCT/CN2017/091429, entitled "METHOD AND DEVICE FOR LOAD PROCESSING" filed on Jul. 3, 2017, which claims priority to Chinese Patent Application No. 201610662366.4, filed with the State Intellectual Property Office of the People's Republic of China on Aug. 12, 2016, and entitled "LOAD SCHEDULING METHOD AND APPARATUS," all of which are incorporated herein by reference in their entirety.

FIELD OF THE TECHNOLOGY

The present disclosure relates to network application, and in particular to a load processing method and apparatus.

BACKGROUND OF THE DISCLOSURE

With the development of network technologies, more and more network services emerge to provide users with various services. Services refer to various matters provided for users, such as interactive live broadcast services. The interactive live broadcast service refers to providing a live broadcast platform on the Internet and providing virtual rooms so that users can interact with an anchor through the virtual rooms. Users can access to a virtual room via an access machine by using a client device during the interactive live broadcast services. The access machine is used to report the load. A load scheduling system performs load scheduling based on the load conditions on the access machine.

SUMMARY

In view of this, the various embodiments of the present disclosure provide improved methods and systems for load processing, to accurately determine the amount of load that an access machine has received.

In one aspect, some embodiments include a service load processing method performed at a computing system. The method includes: obtaining a current time and a reported load amount from an access machine at the current time; determining a delayed cognitive load amount allocated to the access machine at a first time period by subtracting a first time difference from the current time, the first time difference including a time difference between initiation of a scheduling request by a user terminal and access to the access machine by the user terminal; determining an actual load amount of the access machine at the current time by adding the reported load amount and the delayed cognitive load amount; and determining whether the access machine is running at an overload condition by comparing the actual load amount of the access machine at the current time and a maximum load amount threshold for the access machine.

In yet another aspect, some embodiments include a service load processing apparatus comprising one or more processors and memory coupled to the one or more processors, the memory storing one or more programs (or program modules) configured to be executed by the one or more processors, the one or more programs (or program modules) including instructions for performing any of the methods described herein.

In yet another aspect, some embodiments include a non-transitory computer readable storage medium storing one or more programs (or program modules) for execution by one or more processors of a computing system, the one or more programs (or program modules) including instructions for performing any of the methods herein.

Thus, devices, storage mediums, and computing systems are provided with methods for load processing. By taking into consideration the (actual) time of, and the time differences between, initiation of a scheduling request by a user terminal, actual access of the user terminal, and resource allocation times for access machines, and determining actual load volumes of access machines as well as anticipated (e.g., predicted) load volumes from user requests, load assignments to access machines can be determined with higher accuracy, thus leading to better user experience and improved user satisfaction.

DESCRIPTION OF EMBODIMENTS

The present disclosure is further detailed with reference to the accompanying drawings and the embodiments to make the object, technical solutions and advantages of the present disclosure more clearly. It should be understood that the specific embodiments described herein are merely used to explain the present disclosure rather than limit the present disclosure.

It will be understood that the terms "first", "second" used herein may be used to describe various elements, but the elements are not limited by these terms. These terms are only used to distinguish the first element from another element.

In one embodiment of the present disclosure, a load scheduling system receives load amount of a user terminal, connected to an access device, reported by the access device, such as an access machine, and according to the load amount reported by the access machine and the maximum load amount that may be received by the access machine, determined whether the access machine is running under an overload condition or the load amount received by the access machine fails to reach the maximum load mount that may be received by the access machine, i.e., maximum load amount threshold, so as to allocate another user terminal to the access device. The load scheduling system allocates user terminals that access to an access machine to the access machine, and at the time point when the access machine reports load amount, a part of user terminals, such as a user terminal A, have access to the access machine, and another part of user terminals, such as a user terminal B, have not accessed to the access machine. At the reporting time point, the load amount that can be obtained by the access machine is only the load amount generated by the user terminal A, which is reported to the load scheduling system. If the load scheduling system manages the access machine according to the load amount reported by the access machine, i.e. the load amount generate by the user terminal A, to make the access machine receive the maximum load amount, then the load amount received by the access machine, when the user terminal B accesses to the access machine, includes: the maximum load amount and load amount of user terminal B, and then the access machine performs overloaded operation.

Based on the foregoing situation, the embodiments of the present disclosure provide a load processing solution to accurately determine the load amount that the access machine has received, and schedule the user terminal that is received by the access machine, to prevent overloaded operation of the access machine.

Figure 1:
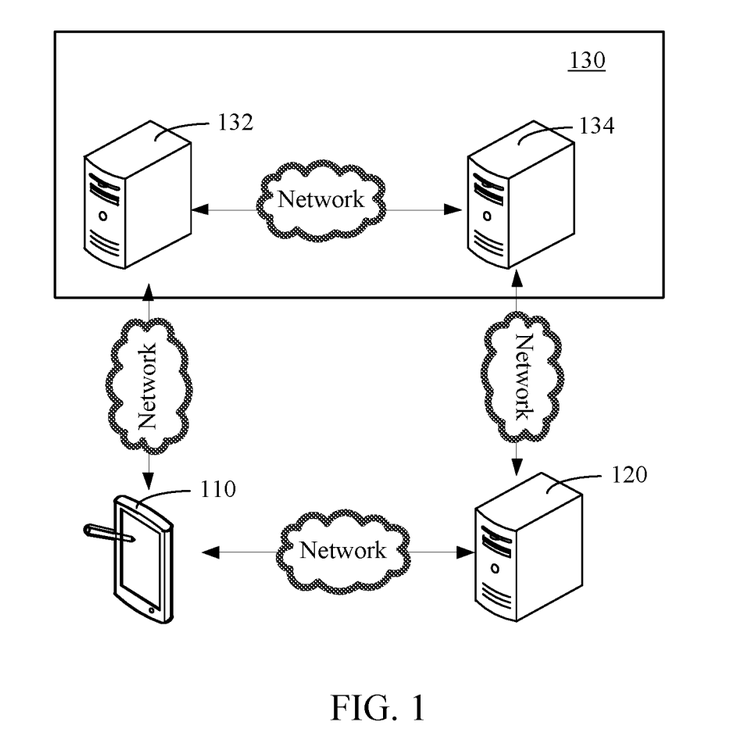
FIG. 1 is a schematic diagram of an application environment of a load scheduling method according to an embodiment of the present disclosure.

FIG. 1 is a schematic diagram of an application environment of a load scheduling method according to an embodiment of the present disclosure. Referring to FIG. 1, the application environment includes a user terminal 110, an access machine 120, and a server 130. The server 130 may provide account information, authentication check and load scheduling services.

A client is installed on the user terminal 110. A user can login and access to the server 130 via the client, and initiate a scheduling request to the server 130. There may be one or more user terminals 110.

There may be one or more access machines 120, each connected to one or more user terminals 110 and each connected to the server 130.

The server 130 regularly receives the load amount reported by the access machine 120, determines (e.g., obtains) the delayed cognitive load amount of the access machine 120, screens out the access machine 120 that does not exceed the maximum load amount threshold according to the load amount reported by the access machine 120 and the delayed cognitive load amount, then calculates the weight value of access machine 120 that is less than the maximum threshold of load amount, allocates the user terminal 110 that initiates a scheduling request to the corresponding access machine 120 according to the weight value, and sends the network address of the access machine 120 to the terminal 110. The user terminal 110 accesses to the corresponding access machine 120 according to the network address of the access machine 120.

In other embodiments, the server 130 may comprise: an authentication server 132 and a scheduling server 134. The authentication server 132 is configured to authenticate the account information and authority of users logged on the user terminal 110. The scheduling server 134 is configured to allocate the user terminal 110 to the corresponding access machine 120 according to the load amount reported by the access machine 120 and the delayed cognitive load amount.

Figure 2:
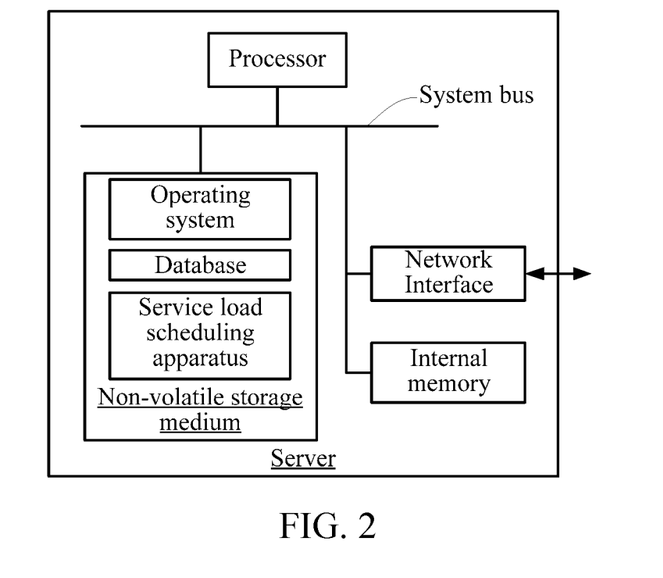
FIG. 2 is a schematic diagram of an internal structure of a server according to an embodiment of the present disclosure.

FIG. 2 is a schematic diagram of an internal structure of a server (or cloud, etc.) according to an embodiment of the present disclosure. As shown in FIG. 2, the server comprises a processor, a non-transitory computer-readable (e.g., non-volatile) storage medium, memory, and a network interface which are connected through a system bus.

A non-volatile storage medium of the server stores an operating system, a database, and a service load scheduling apparatus. The database stores load amount and load amount threshold of the access machine, etc. The service load scheduling apparatus is configured to implement a load scheduling method applied to a server. The server's processor is configured to provide computing and control capabilities.

A memory of the server provides an environment for the operation of a load scheduling apparatus in a non-volatile storage medium. The memory may store computer-readable instructions. When the computer-readable instructions are executed by the processor, the processor may perform a load scheduling method.

A network interface of the server is configured to communicate with a user terminal via a network connection, for example, receiving the scheduling request sent by the user terminal and returning the network address of an access machine to the user terminal.

The server may be a stand-alone server or a server cluster consisting of multiple servers. A person skilled in the art may understand that the structure shown in FIG. 2 is merely a block diagram of a partial structure related to the solutions of the present disclosure, and does not constitute a limitation on the server to which the present disclosure is applied. The particular server may include more or fewer components than those shown in the figure, or combinations of certain components, or have different component layouts.

Figure 3:
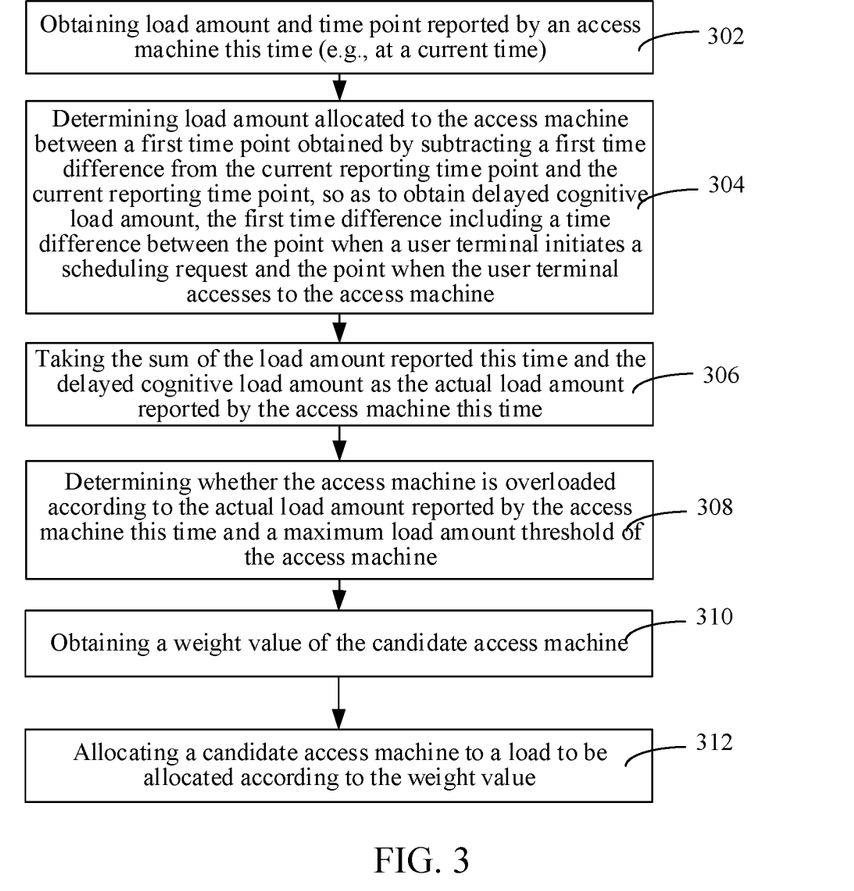
FIG. 3 is a flowchart of a load processing method according to an embodiment of the present disclosure.

FIG. 3 is a flowchart of a load processing method according to an embodiment of the present disclosure. As shown in FIG. 3, a load processing method, running on the server in FIG. 1, comprises:

Step 302: Obtain the load amount and time point reported by an access machine this time (e.g., at a current time).

In this embodiment, load information is periodically reported to the server by each access machine. The load information may include load amount, load identifier, etc. The time interval for periodic reporting may be set as required, such as 2 seconds, 3 seconds, and so on. The time interval for periodic reporting refers to the time interval from the time when an access machine reports load information to the next time it reports the load information, which can be used as an allocation cycle. In other embodiments, the periodic time interval may also be determined based on the service sensitivity and the reported load. For example, in an interactive live broadcast scenario, if the user access delay is in seconds, then the allocation cycle may be 2 seconds, by this way, each access machine reports 30 times within 1 minute.

After obtaining the account and password of a user, the user terminal log in to a server. The server checks the account and password. After being authenticated, the user terminal is allowed to use the account and password to log in to the server. The user terminal generates a service request in response to a user's trigger operation, and initiates a scheduling request to the server according to the service request. According to the scheduling request, the server allocates an accessible access machine for the user terminal.

After the user terminal accesses to the corresponding access machine, the access machine can distribute service data to the user terminal.

Step 304: Determine the load amount allocated to the access machine between a first time point obtained by subtracting a first time difference from the current reporting time point and the current reporting time point, i.e. the delayed cognitive load amount. The first time difference includes a time difference between the time when a user terminal initiates a scheduling request and the time when the user terminal accesses the access machine.

In this embodiment, the time difference between the initiation of the scheduling request by the user terminal and the access to the access machine is taken as the first time difference, denoted by T. The allocation cycle of the access machine is greater than the first time difference.

Due to the existence of the first time difference, the operation of access to the access machine is not completed, at the current reporting time point, by a user terminal allocated to the access machine between the first time point and the current reporting time point. Therefore, the load amount reported at the current reporting time point does not include the load amount corresponding to the user terminal that has not accessed to the access machine.

In order to ensure that no overload situation occurs when allocating load to the access machine again, the delayed cognitive load amount needs to be considered.

The access machine's allocation cycle is greater than the first time difference. The load amount allocated between the last reporting time point and the first time point has accessed to the access machine at the current reporting time point, that is, the load amount reported this time (e.g., at the current time) includes the load amount accessed to the access machine between the last reporting time point and the first time point.

Step 306: Take the sum of the load amount reported this time and the delayed cognitive load amount as the actual load amount reported this time of the access machine.

In order to ensure that no overload situation occurs when allocating load to the access machine again, the delayed cognitive load amount needs to be considered, then the sum of the load amount reported this time and the delayed cognitive load amount is taken as the actual load amount reported this time of the access machine.

Step 308: Determine whether access machine is running under an overload condition by comparing the actual load amount of the access machine reported this time (e.g., at the current time) and the maximum load amount threshold of the access machine.

In this embodiment, an access machine that is not under overload running, i.e. the candidate access machine, is determined according to the actual load amount reported this time (e.g., at the current time) of each access machine and the maximum load threshold of each access machine.

In this embodiment, no overload means that the load amount that has been received by an access machine has not exceeded the upper limit of the load amount that can be received. All access machines can be the same or different. If the access machines are the same, the upper limit of the load amount is the same. If the access machines are different, the upper limit of the load amount may be the same or different.

In one embodiment, the maximum load amount threshold of the access machine comprises a network parameter threshold. Step 308 comprising: calculating a network parameter value corresponding to the actual load amount reported this time (e.g., at the current time) according to the actual load amount reported this time (e.g., at the current time) of the access machine; and determining whether the network parameter value exceeds the network parameter threshold; and determining the access machine as a candidate access machine if the network parameter value does not exceed the network parameter threshold.

The network parameters include one or more of traffic, data packet size, a central processing unit (CPU). When network parameters include more of traffic, data packet size, a central processing unit, etc., if it is determined that the value of one of the network parameters exceed the corresponding network parameter threshold, the access machine will be filtered out.

In one embodiment, the network parameters may further include the number of accessed user terminals. Step 308 comprising: calculating the number of accessed user terminals according to the actual load amount reported this time (e.g., at the current time) of the access machine, determining if the number of accessed user terminals exceeds a threshold of the number of users; and filtering out the access machine if so, and determining the remaining access machine as a candidate access machine.

In one embodiment, in an interactive live broadcast scenario or other scenario, when calculating the load of the access machine, in addition to considering the machine performance such as traffic, data packet size, and CPU, the number of users to access also needs to be considered. For example, in an interactive live broadcast online education scenario, during the lecture, a teacher may start a slide show at the beginning, the traffic and data packet size generated from the slide show is extremely small and do not consume too much CPU. If only the machine performance is considered, excessive user terminals are allocated to each access machine, so that when the teacher suddenly turns on a camera, the bit rate will suddenly increase when uploading the video, which may result in an overload of the access machine.

Network parameters include traffic, data packet size, a central processing unit and number of accessed user terminals. Step 308 comprising: filtering out the access machine and determining the remaining access machine as a candidate access machine when any one of the following occurs: the traffic exceeds the traffic threshold, the data packet size exceeds the data packet size threshold, the central processing unit exceeds the CPU usage threshold, and the number of accessed user terminals exceeds the threshold of the number of users.

Step 310: Obtain a weight value of the candidate access machine.

In this embodiment, the weight value of the candidate access machine can be calculated according to the network parameters of the candidate access machine.

In one embodiment, the obtaining a weight value of the candidate access machine comprises: obtaining the network parameters of the candidate access machine and the parameter weights corresponding to the network parameters; and obtaining a weight value of the candidate access machine by weighted sum of each network parameter value and corresponding parameter weight.

The network parameters include one or more of traffic, data packet size and a central processing unit. The parameter weights include one or more of traffic weight, data packet size weight and CPU weight. Parameter weights correspond to network parameters. If network parameter includes traffic, the parameter weight is the traffic weight. If network parameters include traffic and data packet size, the parameter weights include traffic weight and data packet size weight. If the network parameters include traffic, data packet size, and the central processing unit, the parameter weights include traffic weight, data packet size weight and central processing unit weight.

Traffic refers to the amount of data transmitted in a unit of time. Data packet size refers to the number of data packets transmitted in a unit of time. For different services, the data packet sizes may be different. For example, the size of a voice data packet may be 100 bytes, and the size of a video data packet may be 1 KB (kilobytes). The traffic may be the data packet size multiplied by the number of data packets. Since the transmitted video data packets are large in an interactive live broadcast scenario, the traffic tends to be a performance bottleneck. Therefore, the traffic weight is greater than the CPU (central processing unit) weight, and the CPU weight is greater than the data packet size weight.

Step 312: Allocate the candidate access machine to a user terminal that initiates a scheduling request according to the weight value.

The user terminal that initiates the scheduling request, that is, the user terminal to be allocated, may be a user terminal that initiates a scheduling request. Allocating the access machine to the user terminal to be allocated may comprise: allocating an authority to access to the access machine for the user terminal, so that the user terminal accesses to the access machine. The load generated by the user terminal is the load allocated by the access machine.

Specifically, the candidate access machine is allocated to the user terminals to be allocated in descending order of the weight values.

In the foregoing load processing method, after obtaining the load amount reported this time (e.g., at the current time) and the delayed cognitive load amount allocated to the access machine between a first time point obtained by subtracting a first time difference from the current reporting time point and the current reporting time point, the sum of the load amount reported this time (e.g., at the current time) and the delayed cognitive load amount is taken as actual load amount reported this time (e.g., at the current time), then according to the actual load amount, an access machine that is not overloaded, that is, not running under an overload condition, is screened out. According to the weight value of the access machine, the candidate access machine is allocated to a user terminal to be allocated. Because the user terminal that have been allocated with an authority to access to the access machine and is delayed for access to the access machine is considered, the load that has been allocated to the access machine can be accurately determined, to prevent overload of the access machine. In addition, by allocating loads according to a weight value, loads can be allocated to a plurality of machines over a period of time, effectively preventing the occurrence of jitter during the allocation process.

In one embodiment, the foregoing load processing method further comprises: counting a cumulative number of times of allocating loads to the access machine at all time points within an allocation cycle from the current reporting time point to the next reporting time point, and obtaining the predicted load amount allocated to the access machine till each time point within an allocation cycle according to the cumulative number of times multiplied by the maximum load amount of the access machine; and taking the sum of (i.e., adding) corresponding predicted load amount at the each time point and the actual load amount reported this time (e.g., at the current time) of the access machine as the actual load amount of the access machine at each time point within the allocation cycle.

Specifically, the cumulative number of times of allocating loads to the access machine at all time points within an allocation cycle from the current reporting time point to the next reporting time point refers to the sum of the number of times of allocating loads to the access machine at all time points within an allocation cycle starting from the current reporting time point. The predicted load amount till each time point within an allocation cycle refers to a predicted load amount starting from the current reporting time point and ending at that time point.

Figure 4:
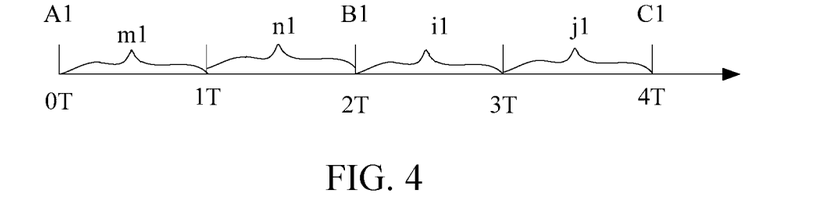
FIG. 4 is a schematic diagram of the load amount with the first time difference being T and the allocation cycle of the access machine being 2T.

Taking the first time difference being T and the allocation cycle of access machine being 2T as an example, as shown in FIG. 4, the load amount reported by an access machine at the time point 0T is A1, the load amount reported by the access machine at the time point 2T is B1, the load amount reported by the access machine at the time point 4T is C1, the cumulative number of times that each access machine is allocated with a load within one allocation cycle from the time point 0T to the time point 2T is recorded. For allocation of the load to the access machine once, the cumulative number of times is added by 1. The number of user terminals to be accessed to the access machine is predicted by the cumulative number of times, and the corresponding load amount is generated, that is, the predicted load amount at each time point is obtained according to the cumulative number of times. For example, the predicted load amount between 0T and 1T is m1, the predicted load amount at 2T is m1+n1, the predicted load amount between 2T and 3T is i1, and the predicted load amount between 3T and 4T is j1. Since the first time difference is T, that is, the time difference from the initiation of the scheduling request by a user terminal to the actual access to the access machine, and the load amount B1 that is reported by the access machine and received by the server include the predicted load amount m1 between 0T and 1T, but does not include the predicted load amount n1 between 1T and 2T, then the actual load amount reported at 2T is load amount B1+predicted load amount n1, and the predicted load amount n1 is the delayed cognitive load amount n1 at the reporting time point 2T. If the server has not received the load amount reported by the access machine at the time point 2T, the value of (A1+m1+n1) may be used as the actual load amount at the time point 2T. The actual load amount at the time point 3T is (B1+n1+i1). If the server has not received the load amount reported by the access machine at the time point 4T, the value of (B1+n1+i1+j1) can be used as the actual load amount at the time point 4T. If the server has received the load amount reported by the access machine at the time point 4T, the actual load amount at the time point 4T is (C1+j1).

Figure 5:
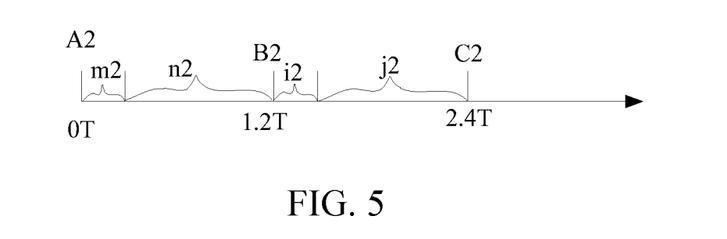
FIG. 5 is a schematic diagram of the load amount with the first time difference being T and the allocation cycle of the access machine being 1.2T.

Taking the first time difference being T and the allocation cycle of access machine being 1.2T as an example, as shown in FIG. 5, the load amount reported by an access machine at the time point 0T is A2, the load amount at the time point 1.2T is B2, the load amount at the time point 2.4T is C2. The predicted load amount at 1.2T is m2+n2, the predicted load amount between 1.2T and 1.4T is i2, and the predicted load amount between 1.4T and 2.4T is j2. Since the first time difference is T, that is, the time difference from the initiation of the scheduling request by a user terminal to the actual access to the access machine, and the load amount B2 that is reported by the access machine and received by the server at the time point 1.2T includes the predicted load amount m2 between 0T and 0.2T, but does not include the predicted load amount between 0.2T and 1.2T, then the actual load amount reported at 1.2T is load amount B2+predicted load amount n2, and the predicted load amount n2 is the delayed cognitive load amount n2 at the reporting time point 1.2T. If the server has not received the load amount reported by the access machine at the time point 1.2T, the value of (A2+m2+n2) may be used as the actual load amount at the time point 1.2T. The actual load amount at the time point 1.4T is (B2+n2+i2). If the server has not received the load amount reported by the access machine at the time point 2.4T, the value of (B2+n2+i2+j2) can be used as the actual load amount at the time point 2.4T. If the server has received the load amount reported by the access machine at the time point 2.4T, the actual load amount at the time point 2.4T is (C2+j2).

Figure 6:
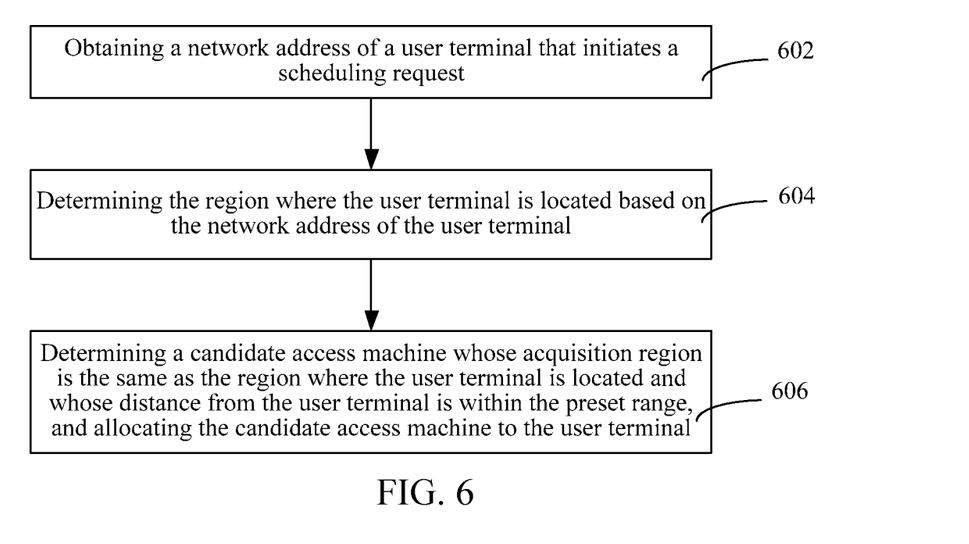
FIG. 6 is a flowchart of a load scheduling method according to another embodiment of the present disclosure.

In one embodiment, as shown in FIG. 6, the forgoing load scheduling method, further comprises:

Step 602: Obtain a network address of a user terminal that initiates a scheduling request.

Specifically, obtaining, by a server, a network address of a user terminal that initiates a scheduling request.

Step 604: Determine the region where the user terminal is located based on the network address of the user terminal.

Specifically, the corresponding region is searched from a corresponding relationship between the network address and the region according to the network address of the user terminal, to obtain the region where the user terminal is located. A region refers to an information region classified by geographical location, such as, Beijing, Shanghai.

Step 606: Determine a candidate access machine whose acquisition region is the same as the region where the user terminal is located and whose distance from the user terminal is within the preset range, and allocate the candidate access machine to the user terminal.

Specifically, the same region refers to the same information region, such as Beijing. The preset range can be set as needed, for example, within 100 km, within 200 km, etc.

For the foregoing load scheduling method, the region of a user terminal is determined by obtaining the network address of the user terminal, according to the region where the first user terminal is located, a candidate access machine whose distance from the user terminal is within the preset range is obtained from candidate access machines in the region, and then the candidate access machine is allocated to the user terminal, thus ensuring the quality of user terminal access.

In one embodiment, when there are multiple candidate access machines whose regions are the same and distances are within a preset range of distance obtained according to the region where the user terminal is located, the weight value of the candidate access machine is obtained, and the candidate access machine is allocated to a corresponding user terminal according to the weight value of the candidate access machine, that is, allocating an authority for the user terminal to access to the candidate access machine.

In this embodiment, the higher the weight value is, the greater the probability that the access machine is allocated to the user terminal.

Figure 7:
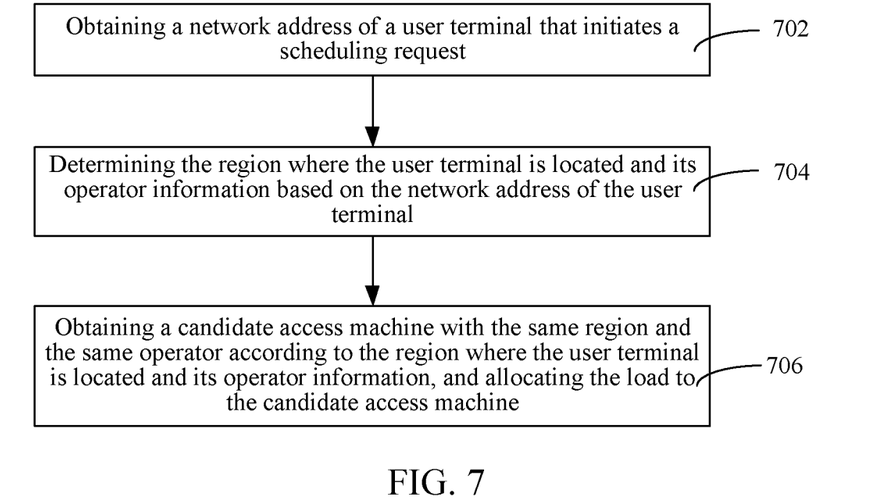
FIG. 7 is a flowchart of a load scheduling method according to another embodiment of the present disclosure.

In one embodiment, as shown in FIG. 7, the foregoing load scheduling method further comprises:

Step 702: Obtain a network address of a user terminal that initiates a scheduling request.

Specifically, obtaining, by a server, a network address of a user terminal that initiates a scheduling request.

Step 704: Determine the region where the user terminal is located based on the network address of the user terminal and its operator information.

Specifically, the corresponding region is searched from a corresponding relationship between the network address and the region according to the network address of the user terminal, to obtain the region where the user terminal is located. A region refers to an information region classified by geographical location, such as, Beijing, Shanghai. Its operator information is searched from a corresponding relationship between network address and operator information according to a user terminal's network address. The operator information may be a telecommunications network, a Netcom network, a Unicom network, a mobile network, etc., but not limited thereto.

Step 706: Obtain a candidate access machine with the same region and the same operator according to the region where the user terminal is located and its operator information; and allocating the load to the candidate access machine.

Specifically, the same region refers to the same information region, such as Beijing. The same operator refers to a same operator, such as a telecommunications network.

For the foregoing load scheduling method, a region where a user terminal is located and its operator information of the user terminal are determined by obtaining a network address of the user terminal; and an access machine with the same region and the same operator as the user terminal is searched, and then the access machine is allocated to the user terminal, by this way, the access machine and the user terminal are in the same region with the same network operator, which further ensuring the quality of the access of the user terminal to the access machine.

In one embodiment, when there are multiple candidate access machines with the same region and the same operator obtained according to the region where a user terminal is located and its operator information, a weight value of the candidate access machine is obtained, and the user terminal is allocated to the corresponding candidate access machine according to the weight value of the candidate access machine.

In this embodiment, the higher the weight value is, the greater the probability that the access machine is allocated to the user terminal.

In one embodiment, after obtaining weight values of candidate access machines, the candidate access machine with the same region and the same operator is obtained according to the region where the user terminal is located and its operator information.

Figure 8:
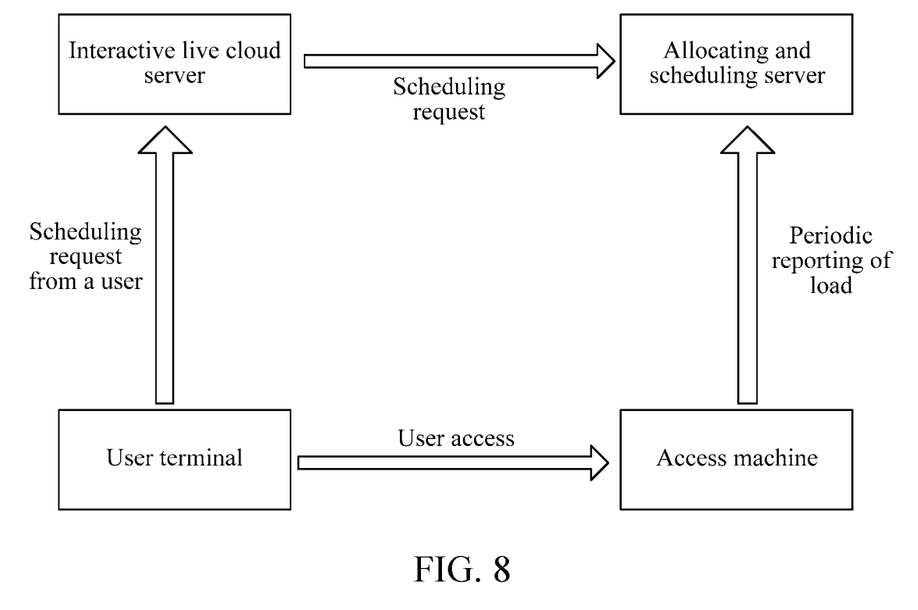
FIG. 8 is a schematic structural diagram of a load scheduling method applied in an interactive live broadcast scenario.

FIG. 8 is a schematic structural diagram of a load scheduling method applied in an interactive live broadcast scenario. As shown in FIG. 8, after a scheduling request initiated by a user terminal is obtained by an interactive live cloud server, user identifiers on the user terminal are checked, and after passing being authenticated, the scheduling request is sent to an allocating and scheduling server. The allocating and scheduling server receives the load amount regularly reported by the access machine, obtains the delayed cognitive load amount, and gets obtains the reported actual load amount reported according to the reported load amount and delayed cognitive load amount. A candidate access machine is obtained through screening according to the actual load amount, then the weight value of the candidate access machine is calculated according to the traffic, data packet size and CPU of the candidate access machine, then the access machine is allocated to the user terminal that initiates the scheduling request according to the weight value, that is, the information about the access machine is sent to the user terminal to allocate an authority privilege for the user terminal to access to the access machine, and the user terminal accesses to the corresponding access machine based on the information of about the allocated access machine. Wherein, the interactive live cloud server refers to a self-built interactive live broadcast platform that serves interactive live broadcast, which can be realized implemented by a server or a server cluster.

It should be noted that, the service scheduling method of the present disclosure may be applied to other service scenarios such as a video conference in addition to an interactive live broadcast scenario.

Figure 9:
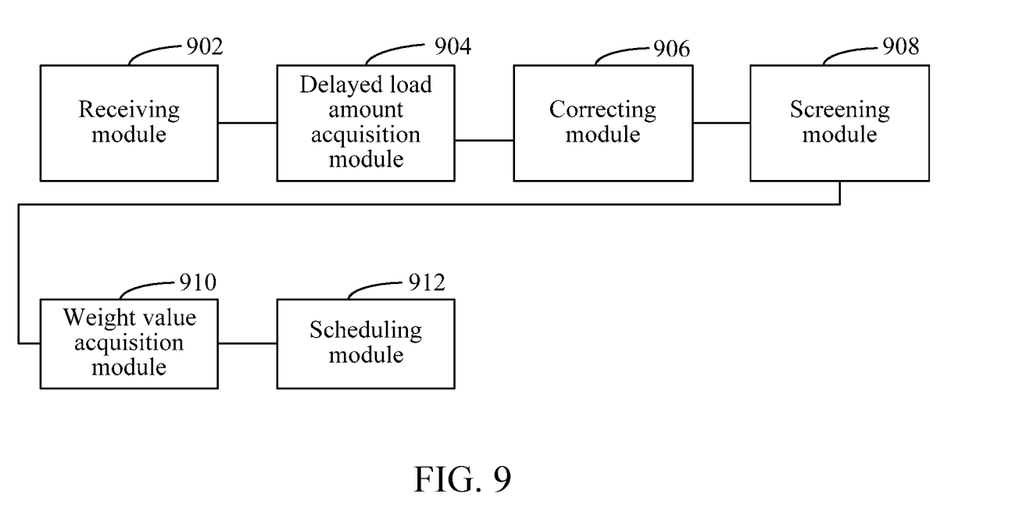
FIG. 9 is a structural block diagram of a load scheduling apparatus according to an embodiment of the present disclosure.

FIG. 9 is a structural block diagram of a load scheduling apparatus according to an embodiment of the present disclosure. As shown in FIG. 9, a load scheduling apparatus, running on a server, comprises a receiving module 902, a delayed load amount acquisition module 904, a correcting module 906, and a screening module 908. In one embodiment of the present disclosure, it further comprises a weight value acquisition module 910 and a scheduling module 912.

The receiving module 902 is configured to obtain load amount and time point reported by an access machine this time (e.g., at the current time).

In this embodiment, load information is periodically reported to the server by each access machine. The load information may include load amount, load identifier, etc. The time interval for periodic reporting may be set as required, such as 2 seconds, 3 seconds, and so on. The time interval for periodic reporting refers to the time interval from the time when an access machine reports load information to the next time it reports load information, which can be used as an allocation cycle. In other embodiments, the periodic time interval may also be determined based on the service sensitivity and the reported load. For example, in an interactive live broadcast scenario, the user access delay is in seconds, then the allocation cycle may be 2 seconds, by this way, each access machine reports 30 times within 1 minute, and the network overhead is acceptable.

The delayed load amount acquisition module 904 is configured to obtain delayed cognitive load amount allocated to the access machine between a first time point obtained by subtracting a first time difference from the current reporting time point and the current reporting time point, the first time difference including a time difference between the initiation of the scheduling request by a user terminal and access to the access machine.

In this embodiment, the time difference between the initiation of the scheduling request by the user terminal and the access to the access machine is taken as the first time difference, denoted by T. The allocation cycle of the access machine is greater than the first time difference.

Due to the existence of the first time difference, for the load amount corresponding to the user terminal allocated to the access machine between a first time point obtained by subtracting a first time difference from the current reporting time point and the current reporting time point, the operation of access to the access machine is not completed by a user terminal allocated to the access machine, thus, the load amount reported at the current reporting time point does not include the load amount corresponding to the user terminal allocated to the access machine during the period of time.

The access machine's allocation cycle is greater than the first time difference. The load amount allocated to the access machine between the last reporting time point and the first time point has accessed to the access machine at the current reporting time point, that is, the load amount reported this time (e.g., at the current time) includes the load amount reported this time (e.g., at the current time) corresponding to the user terminal allocated to the access machine between the last reporting time point and the first time point.

The correcting module 906 is configured to take the sum of the load amount reported this time (e.g., at the current time) and the delayed cognitive load amount as the actual load amount reported this time (e.g., at the current time) of the access machine.

In order to ensure that no overload situation occurs when allocating load to the access machine again, the delayed cognitive load amount should be considered, then the sum of the load amount reported this time (e.g., at the current time) and the delayed cognitive load amount is taken as the actual load amount reported this time (e.g., at the current time) of the access machine.

The screening module 908 is configured to determine whether the access machine is running under an overload condition according to (e.g., by comparing) the actual load amount reported by the access machine this time (e.g., at the current time) and the maximum load amount threshold of the access machine.

In one embodiment of the present disclosure, the screening module 908 is further configured to determine a first candidate access machine that is not running under an overload condition according to the actual load amount reported this time (e.g., at the current time) of access machines and the maximum load amount threshold of access machines.

In this embodiment, no overload means that the load amount that has been received by an access machine has not exceeded the upper limit of the load amount that can be received, i.e. the maximum load amount threshold. All access machines may be the same or different. If the access machines are the same, the upper limit of the load amount is the same. If the access machines are different, the upper limit of the load amount may be the same or different.

In one embodiment, the maximum load amount threshold of the access machine comprises a network parameter threshold. The screening module 908 is further configured to calculate a network parameter value corresponding to the actual load amount reported this time (e.g., at the current time) according to the actual load amount reported this time (e.g., at the current time) of each access machine, determine whether the network parameter value exceeds the network parameter threshold, determine the access machine as the first candidate access machine if the network parameter value does not exceed the network parameter threshold.

The network parameters include one or more of traffic, data packet size, a central processing unit. When network parameters include more of traffic, data packet size, a central processing unit, etc., if it is determined that the value of one of the network parameters exceeds the corresponding network parameter threshold, the access machine will be filtered out.

In one embodiment, the network parameters may further include the number of accessed user terminals. The screening module 908 is further configured to calculate the number of accessed user terminals according to the actual load amount of the access machine reported this time (e.g., at the current time), determine whether the number of accessed user terminals exceeds a threshold of the number of users, filter out the access machine if so, and determine the remaining access machine as a candidate access machine.

In one embodiment, network parameters include traffic, data packet size, a central processing unit and number of accessed user terminals. The screening module 908 is further configured to filter out the access machine and determine the remaining access machine as a first candidate access machine when any one of the following occurs: the traffic exceeds the traffic threshold, the data packet size exceeds the data packet size threshold, the CPU exceeds the CPU usage threshold, and the number of accessed user terminals exceeds the threshold of the number of users.

The weight value acquisition module 910 is configured to obtain a weight value of the first candidate access machine.

In this embodiment, the weight value of the candidate access machine can be calculated according to the network parameters of the candidate access machine.

In one embodiment, the weight value acquisition module 910 is further configured to obtain the network parameters of the first candidate access machine and the parameter weights corresponding to the network parameters, and obtain the weight value of the first candidate access machine by weighted sum of the network parameter values and the parameter weights corresponding to the network parameters.

The network parameters include one or more of traffic, data packet size and a central processing unit. The parameter weights include one or more of traffic weight, data packet size weight and central processing unit weight. Parameter weights correspond to network parameters. If network parameter includes traffic, the parameter weight is the traffic weight. If network parameters include traffic and data packet size, the parameter weights include traffic weight and data packet size weight. If the network parameters include traffic, data packet size, and a central processing unit, the parameter weights include traffic weight, data packet size weight and central processing unit weight.

The scheduling module 912 is configured to allocate a first candidate access machine to a user terminal that initiates a scheduling request according to the weight value.

Specifically, the greater the weight value is, the greater the probability of allocation is, and the smaller the weight value is, the smaller the possibility of allocation is.

For the foregoing load scheduling apparatus, after obtaining the load amount reported this time (e.g., at the current time) and the delayed cognitive load amount allocated to the access machine between a first time point obtained by subtracting a first time difference from the current reporting time point and the current reporting time point, the sum of the load amount reported this time (e.g., at the current time) and the delayed cognitive load amount is taken as actual load amount reported this time (e.g., at the current time), then according to the actual load amount and the maximum load amount threshold of the access machine, whether the access machine is running under an overload condition is determined. Because the load amount corresponding to the user terminal that has been allocated to the access machine and delayed for access to the access machine is considered, the load amount that has been received by the access machine can be accurately determined, to prevent the overload of the access machine.

Figure 10:
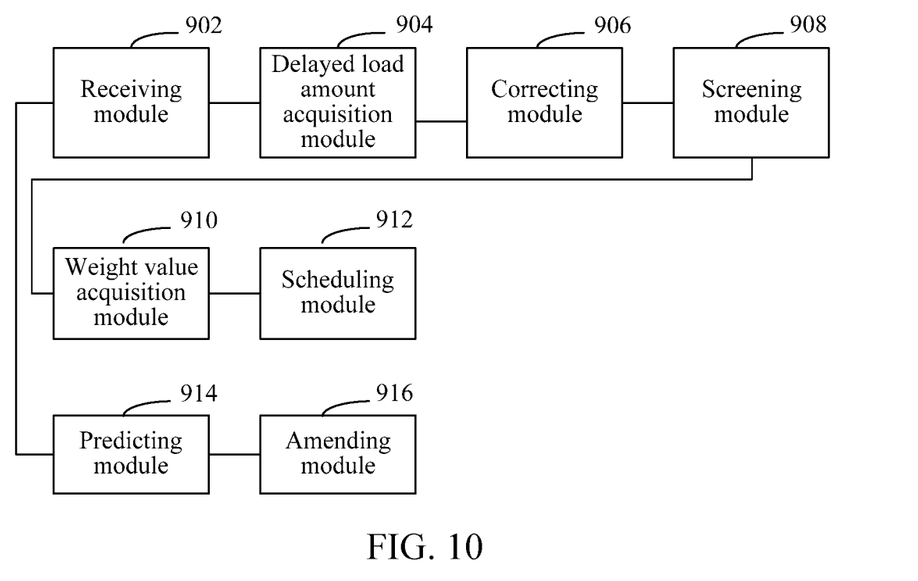
FIG. 10 is a structural block diagram of a load scheduling apparatus according to another embodiment of the present disclosure.

FIG. 10 is a structural block diagram of a load scheduling apparatus according to another embodiment of the present disclosure. As shown in FIG. 10, a loading scheduling apparatus, running on a server, comprises a receiving module 902, a delayed load amount acquisition module 904, a correcting module 906, a screening module 908, a weight value acquisition module 910, and a scheduling module 912, and further comprises a predicting module 914 and an amending module 916.

The predicting module 914 is configured to count a cumulative number of times of allocating loads to the access machine at all time points within an allocation cycle from the current reporting time point to the next reporting time point, and obtain the predicted load amount allocated to the access machine till each time point according to the cumulative number of times.

The amending module 916 is configured to take the sum of the predicted load amount corresponding to each time point and the actual load amount reported by the access machine this time (e.g., at the current time) as the actual load amount of the access machine at each time point.

Specifically, counting a cumulative number of times of allocating loads to the access machine at all time points within an allocation cycle from the current reporting time point to the next reporting time point means that the cumulative number of times of allocating loads to the access machine at certain time points within an allocation cycle starting from the current reporting time point. The predicted load amount till each time point within an allocation cycle refers to a predicted load amount starting from the current reporting time point and ending at that time point.

Figure 11:
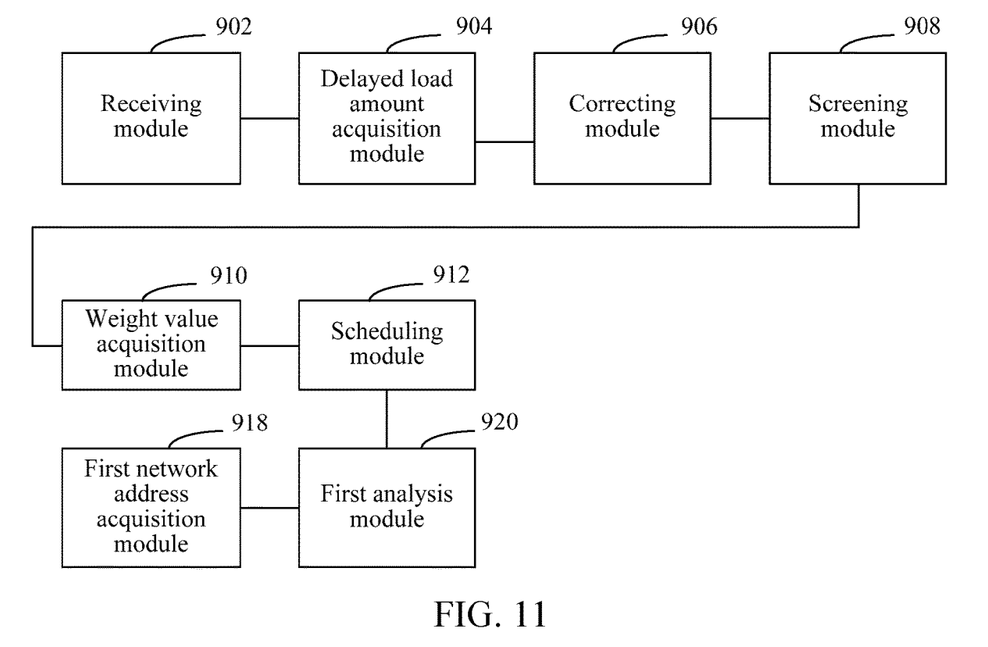
FIG. 11 is a structural block diagram of a load scheduling apparatus according to another embodiment of the present disclosure.

FIG. 11 is a structural block diagram of a load scheduling apparatus according to another embodiment of the present disclosure. As shown in FIG. 11, a loading scheduling apparatus, running on a server, comprises a receiving module 902, a delayed load amount acquisition module 904, a correcting module 906, a screening module 908, a weight value acquisition module 910, and a scheduling module 912, and further comprises a first network address acquisition module 918 and a first analysis module 920.

The first network address acquisition module 918 is configured to obtain a network address of a first user terminal that initiates a first scheduling request.

The first analysis module 920 is configured to determine the region where the first user terminal is located according to the network address of the first user terminal.

The scheduling module 912 is further configured to obtain, according to a region where the first user terminal is located, a second candidate access machine whose distance from the first user terminal is within a preset range from the first candidate access machines in the region, and allocating the second candidate access machine.

For the foregoing load scheduling apparatus, the region where the load is located is determined by obtaining the network address of the load, and a second candidate access machine that is located in the same region as where the first user terminal is located and has a distance from the first user terminal within a preset range is found among the first candidate access machines, and the second candidate access machine is allocated to the first user terminal, thus ensuring the quality of the access of the user terminal to the access machine.

Figure 12:
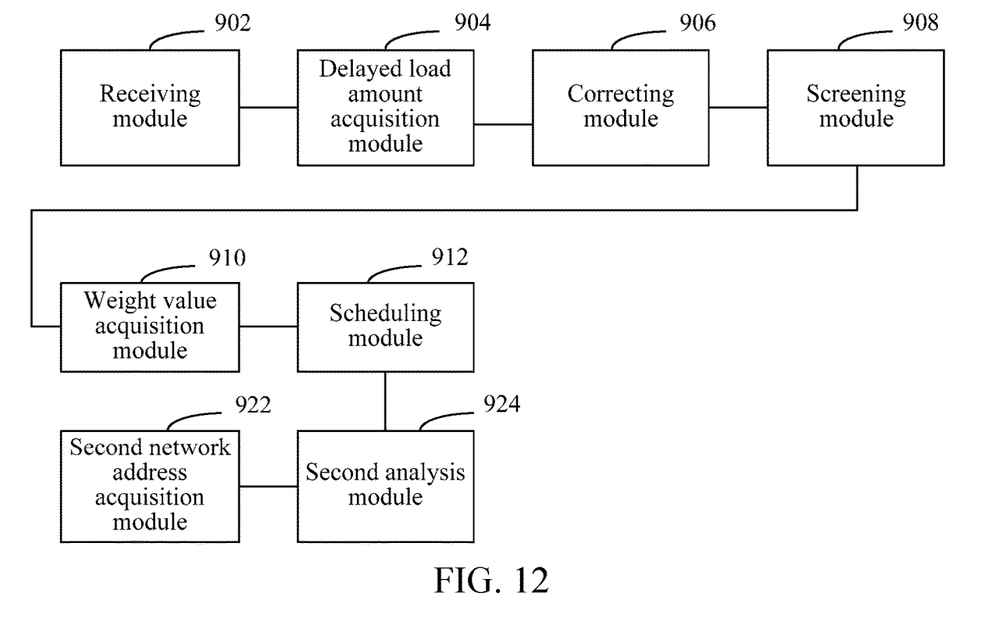
FIG. 12 is a structural block diagram of a load scheduling apparatus according to another embodiment of the present disclosure.

FIG. 12 is a structural block diagram of a load scheduling apparatus according to another embodiment of the present disclosure. As shown in FIG. 12, a loading scheduling apparatus, running on a server, comprises a receiving module 902, a delayed load amount acquisition module 904, a correcting module 906, a screening module 908, a weight value acquisition module 910, and a scheduling module 912, and further comprises a second network address acquisition module 922 and a second analysis module 924.

The second network address acquisition module 922 is configured to obtain a network address of a second user terminal that initiates a second scheduling request.

The second analysis module 924 is configured to determine the region where the second user terminal is located and its operator information according to the network address of the second user terminal.

The scheduling module 912 is further configured to obtain, according to a region where the second user terminal is located and the corresponding operator information, a third candidate access machine whose operator is the same as the operator of the second user terminal from the first candidate access machines in the region, and allocate the third candidate access machine to the second user terminal.

For the foregoing load scheduling apparatus, the region where the load is located and the information about an operator to which the load belongs are determined by obtaining the network address of the load, a third access machine whose operator is the same as the second user terminal among the first candidate access machines in the region is allocated to a second user terminal, by this way, the third candidate access machine and the second user terminal are in the same region with the same network operator, thus ensuring the quality of the access of the user terminal to the access machine.

A person of ordinary skill in the art may understand that all or some of the processes of the foregoing embodiments may be implemented by a program instructing relevant hardware. The program may be stored in a non-volatile computer-readable storage medium. When the program is executed, the processes of the embodiments of the foregoing methods may be included. The non-transitory computer readable storage medium may be a magnetic disk, an optical disk, a Read-Only Memory (ROM), or the like.

The embodiments of the present disclosure provide a computer readable (e.g., non-transitory, non-volatile) storage medium for storing machine-readable instructions, and when the machine-readable instructions are executed, the foregoing method is executed.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A service load processing method performed at a computer system having one or more processor and memory storing programs to be executed by the one or more processors, the method comprising:
   obtaining a current time and a reported load amount from an access machine of a plurality of access machines at the current time;
   predicting a load amount in an allocation cycle immediately before the current time for the access machine;
   determining a delayed cognitive load amount allocated to the access machine from the predicted load amount by subtracting a first time difference from the allocation cycle immediately before the current time, the first time difference including a time difference between initiation of a scheduling request by a user terminal and access to the access machine by the user terminal;
   determining an actual load amount of the access machine at the current time by adding the reported load amount and the delayed cognitive load amount;
   determining whether the access machine is running at an overload condition by comparing the actual load amount of the access machine at the current time and a maximum load amount threshold for the access machine; and
   in accordance with a determination that the access machine is not running at the overload condition:
   setting the access machine as a first candidate access machine of a plurality of candidate access machines corresponding to the plurality of access machines;
   obtaining a weight value of the first candidate access machine according to the actual load amount of the access machine at the current time;
   selecting, among the plurality of candidate access machines including the first candidate access machine, a second candidate access machine having a highest weight value; and
   allocating the second candidate access machine to a second user terminal that initiates a second scheduling request according to the weight value of the second candidate access machine.

2. The method according to claim 1, wherein:
   the maximum load amount threshold of the first candidate access machine comprises a network parameter threshold; and
   determining the first candidate access machine that is not running under the overload condition of the first candidate machine further comprises:
   calculating, for each of a plurality of access machines, a network parameter value corresponding to the actual load amount reported at the current time;
   determining, for each of the plurality of access machines, whether the network parameter value exceeds the network parameter threshold; and
   identifying the first candidate access machine in accordance with a determination that the network parameter value of the first candidate access machine does not exceed the network parameter threshold.

3. The method according to claim 1, wherein obtaining the weight value of the first candidate access machine comprises:
   obtaining one or more network parameters of the first candidate access machine and a parameter weight corresponding to each of the one or more network parameters; and
   obtaining the weight value of the first candidate access machine according to a weighted sum of the one or more network parameters and corresponding parameter weights of the one or more network parameters.

4. The method according to claim 1, further comprising:
   obtaining a network address of a first user terminal that initiates a first scheduling request;
   determining a region where the first user terminal is located according to the network address of the first user terminal;
   determining, according to the region where the first user terminal is located, a second candidate access machine of the plurality of access machines whose distance from the first user terminal is within a preset range; and
   allocating the second candidate access machine to the first user terminal.

5. The method according to claim 1, further comprising:
   obtaining a network address of a second user terminal that initiates a second scheduling request;
   determining a region where the second user terminal is located;
   determining operator information for the second user terminal according to the network address of the second user terminal; and
   obtaining, in accordance with the determining the region where the second user terminal is located and the operator information for the second user terminal, a third candidate access machine of the plurality of access machines, wherein the third candidate access machine is located in the same region as the second user terminal and has the same operator; and allocating the third candidate access machine to the second user terminal.

6. The method according to claim 1, further comprising:

counting a cumulative number of times of allocating loads to the access machine at all time points within an allocation cycle from the current time to a next reporting time point;

obtaining predicted load amount allocated to the access machine till each time point according to the cumulative number of times; and taking the sum of the predicted load amount corresponding to each time point and the actual load amount reported by the access machine as the actual load amount of the access machine at each time point.

7. A service load processing apparatus, comprising:

one or more processors;

memory coupled to the one or more processors; and one or more program modules stored in the memory that, when executed by the one or more processors, cause the service load processing apparatus to:

obtain a current time and a reported load amount reported by an access machine of a plurality of access machines at the current time;

predict a load amount in an allocation cycle immediately before the current time for the access machine;

determine a delayed cognitive load amount allocated to the access from the predicted load amount by subtracting a first time difference from the allocation cycle immediately before the current time, the first time difference including a time difference between initiation of a scheduling request by a user terminal and access to the access machine by the user terminal;

determine an actual load amount of the access machine at the current time by adding the reported load amount and the delayed cognitive load amount;

determine whether the access machine is running at an overload condition by comparing the actual load amount reported by the access machine at the current time and a maximum load amount threshold for the access machine; and in accordance with a determination that the access machine is not running at the overload condition:

set the access machine as a first candidate access machine of a plurality of candidate access machines corresponding to the plurality of access machines;

obtain a weight value of the first candidate access machine according to the actual load amount of the access machine at the current time;

select, among the plurality of candidate access machines including the first candidate access machine, a second candidate access machine having a highest weight value; and allocate the second candidate access machine to a second user terminal that initiates a second scheduling request according to the weight value of the second candidate access machine.

8. The service load processing apparatus according to claim 7, wherein the service load processing apparatus is further configured to:

obtain one or more network parameters of the first candidate access machine and a parameter weight corresponding to each of the one or more network parameters; and obtain the weight value of the first candidate access machine by a weighted sum of the one or more network parameter and the parameter weights corresponding to the one or more network parameters.

9. The service load processing apparatus according to claim 7, wherein the service load processing apparatus is further configured to:

obtain a network address of a first user terminal that initiates a first scheduling request; and determine a region where the first user terminal is located according to the network address of the first user terminal.

10. The service load processing apparatus according to claim 7, wherein the service load processing apparatus is further configured to:

obtain a network address of a second user terminal that initiates a second scheduling request;

determine a region where the second user terminal is located and determine operator information for the second user terminal according to the network address of the second user terminal; and obtain in accordance with determining the region where the second user terminal is located and the operator information for the second user terminal, a third candidate access machine of the plurality of access machines, wherein the third candidate access machine is located in the same region as the second user terminal and has the same operator.

11. The service load processing apparatus according to claim 7, wherein the service load processing apparatus is further configured to:

count a cumulative number of times of allocating loads to the access machine at all time points within an allocation cycle from the current time to the next reporting time point; and obtain the predicted load amount allocated to the access machine till each time point according to the cumulative number of times; and take the sum of the predicted load amount corresponding to each time point and the actual load amount reported by the access machine as the actual load amount of the access machine at each time point.

12. A non-transitory computer readable storage medium storing one or more programs or modules, the one or more programs or modules comprising a plurality of instructions which, when executed by a computer system, cause the computer system to perform operations comprising:

obtaining a current time and a reported load amount from an access machine of a plurality of access machines at the current time;

predicting a load amount in an allocation cycle immediately before the current time for the access machine;

determining a delayed cognitive load amount allocated to the access machine in the allocation cycle immediately before the current time by subtracting a first time difference from the allocation cycle immediately before the current time, the first time difference including a time difference between initiation of a scheduling request by a user terminal and access to the access machine by the user terminal;

determining an actual load amount of the access machine at the current time by adding the reported load amount and the delayed cognitive load amount;

determining whether the access machine is running at an overload condition by comparing the actual load amount of the access machine at the current time and a maximum load amount threshold for the access machine; and in accordance with a determination that the access machine is not running at the overload condition:
- setting the access machine as a first candidate access machine of a plurality of candidate access machines corresponding to the plurality of access machines;
- obtaining a weight value of the first candidate access machine according to the actual load amount of the access machine at the current time;
- selecting, among the plurality of candidate access machines including the first candidate access machine, a second candidate access machine having a highest weight value; and
- allocating the second candidate access machine to a second user terminal that initiates a second scheduling request according to the weight value of the second candidate access machine.

13. The computer readable storage medium of claim 12, wherein:

the maximum load amount threshold of the first candidate access machine comprises a network parameter threshold; and wherein the instructions for determining the first candidate access machine that is not running under the overload condition of the first candidate machine further comprises instructions for:
- calculating, for each of the plurality of access machines, a network parameter value corresponding to the actual load amount reported at the current time;
- determining, for each of the plurality of access machines, whether the network parameter value exceeds the network parameter threshold; and
- identifying the first candidate access machine in accordance with a determination that the network parameter value of the first candidate access machine does not exceed the network parameter threshold.

14. The computer readable storage medium of claim 12, wherein the instructions for obtaining the weight value of the first candidate access machine further comprises instructions for:

- obtaining one or more network parameters of the first candidate access machine and a parameter weight corresponding to each of the one or more network parameters; and
- obtaining the weight value of the first candidate access machine according to a weighted sum of the one or more network parameters and corresponding parameter weights of the one or more network parameters.

15. The computer readable storage medium of claim 12, wherein the plurality of instructions further comprise instructions for:
- obtaining a network address of a first user terminal that initiates a first scheduling request;
- determining a region where the first user terminal is located according to the network address of the first user terminal;
- determining, according to the region where the first user terminal is located, a second candidate access machine of the plurality of access machines whose distance from the first user terminal is within a preset range; and
- allocating the second candidate access machine to the first user terminal.

16. The computer readable storage medium of claim 12, wherein the plurality of instructions further comprise instructions for:
- obtaining a network address of a second user terminal that initiates a second scheduling request;
- determining a region where the second user terminal is located;
- determining operator information for the second user terminal according to the network address of the second user terminal; and
- obtaining, in accordance with the determining the region where the second user terminal is located and the operator information for the second user terminal, a third candidate access machine of the plurality of access machines, wherein the third candidate access machine is located in the same region as the second user terminal and has the same operator; and
- allocating the third candidate access machine to the second user terminal.

* * * * *